(12) United States Patent
Chen et al.

(10) Patent No.: US 7,628,876 B2
(45) Date of Patent: Dec. 8, 2009

(54) FRICTION STIR WELD BONDING OF METAL-POLYMER-METAL LAMINATES

(75) Inventors: Yen-Lung Chen, Troy, MI (US); Douglas L. Faulkner, Oak Park, MI (US); Peter M. Parlow, Columbus, MI (US); Mark W. Verbrugge, Troy, MI (US); Xiaohong Q. Gayden, West Bloomfield, MI (US); John D. Fickes, Brighton, MI (US); Peter H. Foss, Oxford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 378 days.

(21) Appl. No.: 11/549,686

(22) Filed: Oct. 16, 2006

(65) Prior Publication Data
US 2007/0187469 A1   Aug. 16, 2007

Related U.S. Application Data

(60) Provisional application No. 60/730,499, filed on Oct. 25, 2005.

(51) Int. Cl.
*B32B 37/00* (2006.01)

(52) U.S. Cl. .................. 156/73.5; 156/290; 156/308.4; 228/112.1

(58) Field of Classification Search ................ 156/73.5, 156/580, 290, 308.4; 228/112.1, 2.1
See application file for complete search history.

(56) References Cited

U.S. PATENT DOCUMENTS 6,742,697 B2 *   6/2004   McTernan et al. ......... 228/112.1
2004/0173662 A1 *   9/2004   Christner .................. 228/112.1

* cited by examiner

*Primary Examiner*—James Sells
(74) *Attorney, Agent, or Firm*—Reising Ethington P.C.

(57) ABSTRACT

In an assembly of facing metal sheets separated by a polymer layer, welded metallurgical bonds are formed between the metal sheets by use of a friction stir weld tool. A rotating tool penetrates the first sheet, locally displaces the encountered portion of polymer film and penetrates into the second sheet. The affected metal of the two sheets is momentarily plasticized and stirred, and the plasticized metal of the two sheets combines to form a weld between the metal sheets. The interposed polymer film may be intended to serve as an adhesive or a vibration damping medium or the like. The facing metal sheets can be layers of facing laminated metal sheet structures that each comprise two metal sheets bonded by an adhesive interlayer.

17 Claims, 2 Drawing Sheets

FRICTION STIR WELD BONDING OF METAL-POLYMER-METAL LAMINATES

This application claims priority based on provisional application 60/730,499, filed Oct. 25, 2005, titled "Friction Stir Weld Bonding of Metal-Polymer-Metal Laminates," and which is incorporated herein by reference.

TECHNICAL FIELD

This invention pertains to making welded connections between metal layers or sheets that are separated by a layer of polymeric material. More specifically, this invention relates to a practice of making friction stir welds between metal sheets separated by a polymeric layer such as an adhesive layer, or a layer of viscoelastic vibration damping material, or the like. The invention also pertains to making welded connections between such a metal-polymer-metal laminates and a solid metal object or another metal-polymer-metal laminate.

BACKGROUND OF THE INVENTION

There are articles of manufacture that are made using two facing metal sheets with an interposed layer of relatively soft and flexible polymeric material. The sheets may be of the same or different metal alloy composition. Sometimes the interposed polymer layer is an adhesive for bonding the metal sheets in a sandwich-like assembly. While the adhesive joins the sheets, it may also provide a corrosion resistant layer when the sheets are of different composition. In other applications the polymer layer may be a viscoelastic material for providing sound and vibration damping properties to the laminated metal sheet assembly.

Often it is desired to supplement whatever adhesion is provided between the sheets by the polymer layer to prevent them from peeling apart when the layered sheet structure is handled or formed. Resistance spot welding and rivet bonding are two methods of joining sheets that have been laminated for sound deadening or for increasing the resistance to peeling of adhesively bonded sheets. Each of these joining methods has disadvantages, and it is an object of this invention to provide an alternative method of providing bonds between facing metal sheets separated by a polymer layer. Furthermore, it is an object of this invention to provide an improved method of bonding a metal-polymer-metal laminate to a solid metal article or of bonding two metal-polymer-metal laminates.

SUMMARY OF THE INVENTION

This invention is applicable to the joining of two or more metal workpieces with a polymer layer between facing surfaces of at least two of the workpieces. The metal workpieces will typically, but not necessarily, be in the form of sheets or plates and the workpieces may be of the same or dissimilar metal alloy compositions. In some embodiments of the invention the layer or film of polymer is an adhesive layer for bonding facing surfaces of the workpieces. In other embodiments of the invention the polymer layer serves a different function; the polymer layer may, for example, be a viscoelastic composition for sound and vibration dampening. But whatever the function of the polymer layer, a spot weld or linear weld is formed between the metal workpieces through the polymer layer by a friction stir welding practice. In some applications the polymer layer may be formulated so as to have electrical conductivity, but the practice of this invention does not have to utilize such conductivity.

Friction stir welding uses a rotating tool that is sized and shaped for a welding application. Generally, the tool is characterized by a round shank with an end that serves as a shoulder for a smaller diameter, axially extending probe. The rotating probe is pressed into a metal surface or between abutting metal surfaces and the rotating shoulder of the tool may also engage the workpiece. The friction between the rotating tool and the contacted metal locally heats the workpiece(s) to momentarily soften, plasticize, and stir the metal. The stirred materials coalesce behind or around the probe when the tool is moved forwardly or retracted. Where, for example, the workpiece comprises two metal sheets separated by a polymer film, the rotating probe is shaped to penetrate through one metal sheet, displace the underlying polymer film, and penetrate into the second metal sheet. When the probe has fully penetrated the workpiece, the shoulder of the tool may then engage the upper surface of the first metal sheet further heating the weld site. When the rotating tool is withdrawn the plasticized sheet metal at the interfaces of the two sheets unites to form a spot weld that joins the sheets through the otherwise intervening polymer film. A linear weld is formed when the rotating tool is moved in a path between or through the workpieces and then retracted after traveling a predetermined distance.

A series of such friction stir spot welds or linear welds can be formed around the periphery or at other suitable locations or patterns of the sheet metal-polymer film sandwich assembly. Where the polymer film is a heat curable adhesive the welds provide both a temporary bond between the sheets until the adhesive is cured and, thereafter, a supplementary bond resistant to peeling of the metal sheets. Where the polymer film serves a non-bonding function, the friction stir welds serve to join the sheets against the interposed polymer layer.

The friction stir welding tool including its probe is shaped to penetrate and plasticize the metal layers to be joined, and it is formed of a suitable hard and temperature resistant material to perform its function. A single tool may be used to successively form specified spot welds or linear welds between facing metal sheets or workpieces. Or a group of such rotating tools can be used in combination to make a group of welds at the same time.

The practice of this invention is applicable to welding the facing metal sheets in a single metal-polymer-metal laminate. And it can be used when more metal layers are involved, with or without more intervening polymer layers. For example, two overlying metal-polymer-metal layered laminates with six material layers may be welded. In this example, the probe of the welding tool penetrates through the three layers of the upper laminate workpiece and through two layers of the lower laminate and into the bottom metal layer. Thus, the tool displaces two intervening polymer layers and ultimately forms a weld spanning from the top metal layer of the first laminate to the bottom metal layer of the second laminate. In another example, a single three-layer laminate is bonded to an underlying (or overlying) metal workpiece, with or without a second polymer layer. Again, the friction stir tool penetrates all intervening layers to form a weld between a top metal layer and a bottom metal layer of the assembled pieces.

In friction stir welding the metal is softened and plasticized, and may contain a small portion of liquid phase material, such as the low-melting point intermetallic phases in an aluminum-magnesium alloy system, but it is not fully melted. The resultant welds may not be as strong as conventional metal to metal welds that do not involve the formation of low-strength intermetallic phases during friction stir welding. The adhesive properties of the polymer layer often supplement the strength of the weld.

A further advantage of friction stir spot or linear welding applied to metal sheet-polymer film-metal sheet assemblies is that the metal layers can be of different alloys. They remain separated over most of their facing surfaces to minimize interfacial corrosion, while they are joined in friction stir welds of minimal contacting surface area.

Other advantages of the invention will be apparent from a description of certain preferred embodiments.

DESCRIPTION OF THE PREFERRED EMBODIMENT

Figure 1:
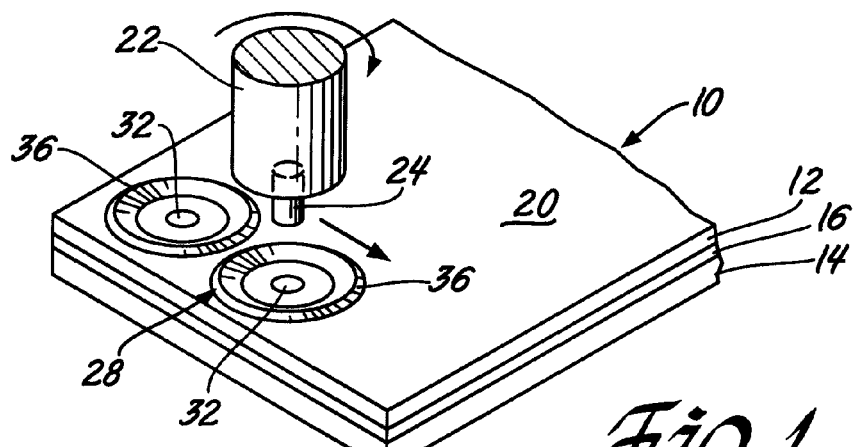
FIG. 1 is an oblique view of a friction stir weld tool retracted above the upper sheet of a metal sheet-polymer film-metal sheet assembly in a process of forming a series of spot welds along one edge of the sandwich structure.

This invention uses a friction stir welding process to form spot welds or linear welds between facing metal sheets separated by a polymer layer. The need to form such welded bonds arises because assemblies of two facing metal sheets separated by a polymer layer are useful in making many articles of manufacture. For example, a laminate of two thin steel sheets with an interposed viscoelastic polymer sound damping layer can be formed into useful automotive panels or other parts. Or a combination of two sheets of different metal compositions, selected for complementary performance characteristics, can be separated with an adhesive layer for corrosion resistance or improved joint properties and formed into useful sheet or panel structures. In either example or in other situations, it may be desired to form spot welds or linear welds between the facing metal surfaces to better join them and/or to resist delamination.

In general, the practice of the invention pertains to friction stir welding of a plurality of metal layers with one or more interposed polymer layers. The resulting linear or spot weld extends from an upper metal layer through intervening polymer and metal layers to a bottom metal layer or article. For example, two overlying metal-polymer-metal laminates may be welded with the weld extending from a top metal layer through two polymer layers and two metal layers to a bottom metal layer or article. In another example, a metal-polymer-metal laminate may be welded to a metal body with or without an interposed polymer layer. The practice of the invention will be illustrated first in joining two metal sheets separated by a polymer layer.

The practice of the invention uses one or more friction stir welding machines, each typically comprising a motor-driven rotating welding tool and fixturing means for positioning the tool against an assembly of the laminated metal sheets. The sandwich sheet assembly usually, but not necessarily, comprises two facing metal sheets of like shape (which is determined by the intended use of the laminated structure) with an interposed co-extensive polymer layer or film. The thickness of each sheet is predetermined for its intended application and is often in the range of about 0.5 to about 4 millimeters (mm). The thickness of the polymer layer is likewise determined by its function and is usually no thicker than the metal sheets. The laminated assembly is suitably supported on a table or fixture for the imposition of the force of the friction stir weld tool(s) in forming one or more spot welds or linear weld seams between the facing metal sheets.

The welding end of the rotatable friction stir tool has a hard probe that is suitably rod or cone shaped with a rounded (for example, hemispherical) or flat end. The tool and especially the probe must have sufficient hardness, wear resistance, and high temperature strength to form repeated welds in the sheet metal assembly where the plasticizing heat for formation of the weld(s) arises from high force frictional contact between the rotating tool and the held-in-place sheet metal assembly. The probe is often suitably formed of a tool steel or a refractory material.

FIG. 1 illustrates a portion of a laminated sheet metal assembly 10. In practice, the assembly would be supported on a suitable holding table or fixture which is not shown in the figure to simplify the illustration. As viewed in FIG. 1, the laminated sheet metal assembly 10 includes an upper metal sheet 12, a lower metal sheet 14 and an interposed polymer layer 16. By way of example, metal sheets 12 and 14 may each be of an aluminum alloy, each about 1.0 mm thick and of major surface area and shape for forming into a desired panel structure. Polymer layer 16 may be of a suitable adhesive or sound and vibration damping composition and pre-applied to one of the sheets to a nominal coating thickness of about 0.2 mm before the other sheet is placed on the polymer coating layer. Thus, the thicknesses of the metal sheets and polymer layers in the drawing figures are somewhat enlarged for easier viewing. In this example, the facing metal sheets of the laminated assembly are to be bonded together with a series of spot welds along the periphery of the sheet assembly.

In accordance with this invention a rotatable friction stir welding tool is used in forming a sequence of friction stir spot welds between metal sheets 12 and 14 with included polymer layer 16. Friction stir welding tool 22 would be motor driven and suitably supported for accurate engagement with selected surface locations on the top surface of upper sheet 12. Such tools are known and, for simplicity of illustration, only the lower end of rotatable tool 22 and probe 24 with hemispherical tip (hemispherical tip 26 is better seen in FIGS. 2A-2C) are shown. As viewed in FIG. 1, friction stir welding tool 22 has formed two friction stir spot welds which are indicated schematically by circles 28 on the top surface 20 of upper sheet 12. Circles 28 illustrate that the friction stir welding process has momentarily plasticized and stirred the aluminum metal in sheet 12 and in sheet 14 at the locations of the circles 28. The metal has changed only in that it was temporarily softened and plasticized by friction stir welding tool 22 in forming two welds. Since the approximate thickness of the metal sheets 12, 14 and polymer layer 16 laminate is about 2.2 mm, the length of probe 24 is suitably about 1.8 mm. By way of example, the diameter of probe 24 may be about 3 mm. As illustrated in FIG. 1 the friction stir weld tool 22 is about to be moved to the right to form a third weld between sheets 12 and 14.

Figure 2A:
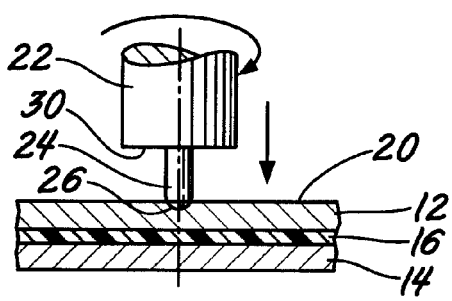
FIGS. 2A-2C are three cross-sectional views at a local joining region of metal sheet-polymer film-metal sheet assembly schematically illustrating the progressive movement of the friction stir weld tool in making a single spot weld between the metal sheets.
Figure 2B:
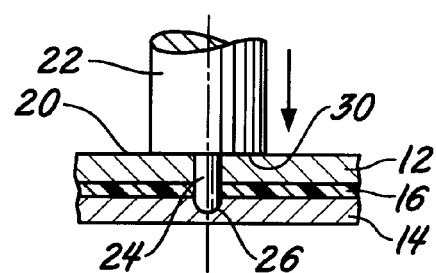
Figure 2C:
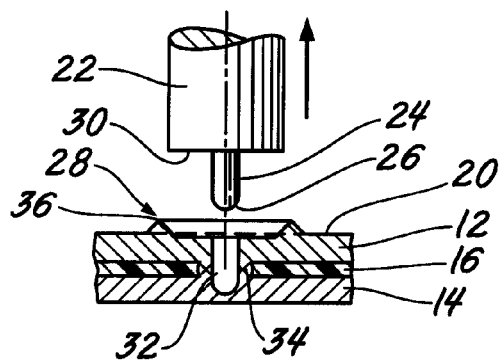

FIGS. 2A-2C are cross-sectional views of a small portion of laminated sheet metal assembly 10 at a representative predetermined location for the formation of a friction stir spot weld, for example a third weld between sheets 12 and 14. In FIG. 2A the rounded tip 26 of probe 24 is being pressed into upper surface 20 of sheet 12. The speed of rotation of tool 22 and the pressure applied by probe 24 are determined by experience or experiment to soften the engaged metal of sheet 12 and to penetrate and plasticize it. While this plasticization is not readily illustrated in FIGS. 2A and 2B, the metal is plasticized to permit probe 24 to penetrate sheet 12.

In FIG. 2B, probe 24 has penetrated through metal sheet 12 and polymer layer 16 and entered lower metal sheet 14. The length of probe 24 is made sufficient to penetrate at least part way through the thickness of lower sheet 14 as seen in FIG. 2B. Probe 24 is thus now stirring and plasticizing the surrounding metal in both metal sheets 12 and 14 and has shoved aside the polymer material contacted by the probe 24. The rotating shoulder portion 30 surrounding the probe 24 at the lower end of tool 22 now also engages the underlying upper surface 20 of metal sheet 12 thereby further heating the metal. After friction stir tool probe 24 has suitably stirred metal in both metal sheets 12, 14 it is retracted while still rotating.

FIG. 2C schematically illustrates the friction stir weld site in the laminate body formed of metal sheet 12, polymer layer 16 and metal sheet 14. Retracted friction stir weld probe 24 is shown poised above sheet 12 leaving a probe-shaped hole 32. The probe 24 is ready to be moved to the next weld site. The stirred metal in sheets 12 and 14 has flowed together to form annular weld 34 around hole 32. Weld 34 extends from sheet 12 past the displaced portion of polymer layer 16 to sheet 14 and thus locally bonds metal sheet 12 to metal sheet 14 with metal from the two sheets. The polymer layer 16 surrounds weld 34 but is not incorporated in it. The stir action of tool 22 has slightly depressed the underlying surface of metal sheet 12 and displaced metal into an annular ridge 36 on the upper surface 20 of metal sheet 12.

It is seen that the disclosed practice of friction stir welding provides a practical, clean, and efficient method of joining two metal sheets with an interposed polymer layer. A suitable friction stir welding probe is devised and shaped to penetrate though one metal sheet and into or through a second metal sheet or surface. The rotating probe displaces the portion of the polymer layer that it encounters and softens and stirs the metal regions that it engages for forming a weld. Softened metal from each of the facing sheets flows to make a suitably strong weld when the tool is retracted from the weld location. In the above example a series of spot welds were formed by successively working the sheet at predetermined spot weld locations. However, once a tool has penetrated the sheets to a suitable depth, the tool can be slowly moved in the metal sheets to form a progressive linear weld. And a group or cluster of rotating welding tools can be used in unison to simultaneously form a number of spot or linear welds.

Figure 3:
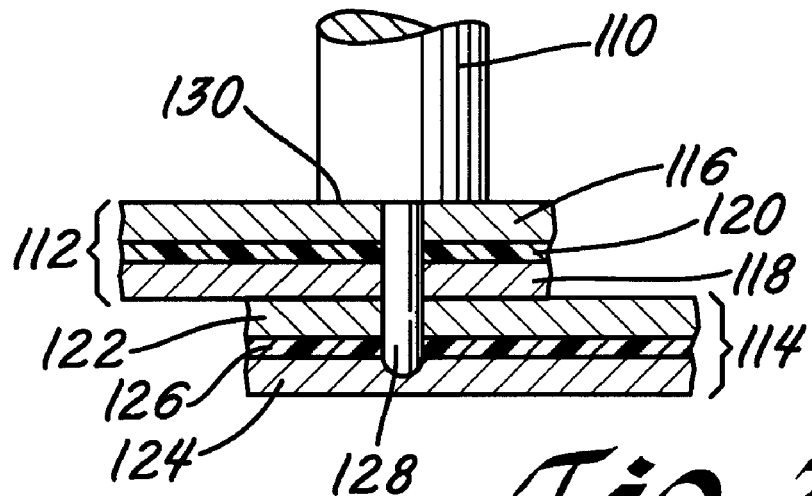
FIG. 3 is a schematic cross-sectional view at a local joining region of a first metal-polymer-metal laminate overlying a second laminate for friction stir welding. This figure is intended to illustrate the depth to which the friction stir tool penetrates the overlying two laminates in the tool's fully inserted position for a spot weld.

FIG. 3 illustrates another embodiment of the invention. Friction stir welding tool 110 is used to form a spot weld at overlapping peripheral edges of a first metal laminate 112 and a second metal laminate 114. In the assembly illustrated in FIG. 3, first metal laminate 112 has an upper metal sheet 116, a lower metal sheet 118 and an interposed polymer layer 120. Similarly, the second metal laminate has an upper metal sheet 122, a lower metal sheet 124, and an interposed polymer layer 126. The preformed metal laminates are to be bonded with lower metal sheet 118 of first metal laminate 112 facing the upper metal sheet 122 of second metal laminate 114. But the spot weld is to join each of the metal sheets 116, 118, 122, and 124. In the case in which each of the metal sheets is about 0.5 mm thick and each polymer layer about 0.2 mm thick, the total thickness of the overlapping assembly of metal laminates 112, 114 is about 2.4 mm. The friction stir welding tool 110 must be sized and shaped to form such a weld.

In the illustration of FIG. 3, the probe 128 of rotating friction stir weld tool 110 has penetrated through metal sheets 116, 118, 122 and polymer layers 120, 126, and entered lowest metal layer 124. The shoulder 130 of rotating friction stir weld tool 110 is bearing on the upper side of metal sheet 116 and heating the sheet by frictional contact. The rotation of tool 110 displaces polymer material in layers 120, 126 from the weld site and stirs and plasticizes adjacent metal in sheets 116, 118, 122, and 124. When the rotating friction stir weld tool 110 with probe 128 is retracted a small hole remains (similar to that schematically illustrated at 32 in FIG. 2C) enclosed by an annular weld containing metal contributed by the friction heated and plasticized regions of the four metal sheets 116, 118, 122, and 124.

Figure 4:
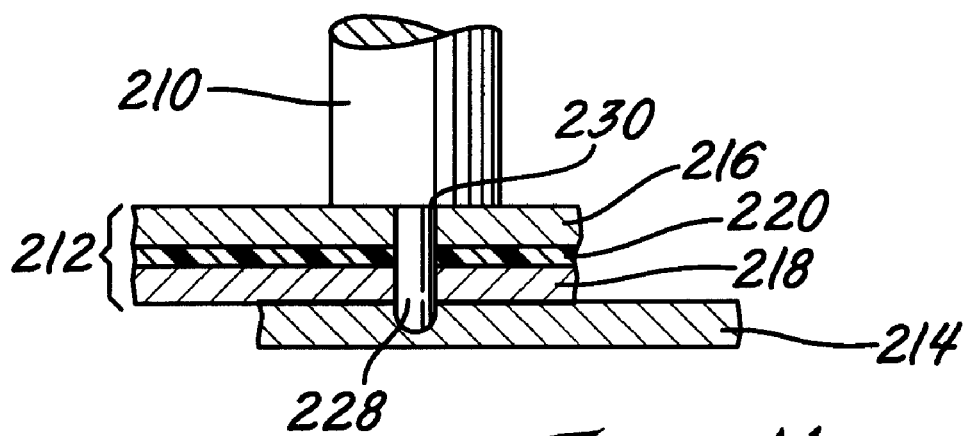
FIG. 4 is a cross-sectional view at a local joining region of a metal-polymer-metal laminate overlying a metal sheet for friction stir welding. This figure is intended to illustrate the depth to which the friction stir tool penetrates the laminate and metal sheet in the tool's fully inserted position for a spot weld.

FIG. 4 illustrates still another embodiment of the invention. Friction stir welding tool 210 is used to form a spot weld at overlapping peripheral edges of a metal laminate 212 and another metal workpiece, in this case a metal sheet 214. In the assembly illustrated in FIG. 4, first metal laminate 212 has an upper metal sheet 216, a lower metal sheet 218 and an interposed polymer layer 220. The edge of metal sheet 214 faces the edge of the bottom sheet 218 of the metal laminate 212. Thus, a spot weld is to be formed attaching each of the metal sheets 216, 218, and 214. In the case in which each of the metal sheets 216, 218 is about 0.5 mm thick, metal sheet 214 is about 1.0 mm thick, and polymer layer 220 is about 0.2 mm thick, the total thickness of the overlapping assembly of metal laminate 212 and metal sheet 214 is about 2.2 mm. The friction stir welding tool 210 is sized and shaped to form such a spot weld.

In the illustration of FIG. 4, the probe 228 of rotating friction stir weld tool 210 has penetrated through metal sheets 216 and 218 and polymer layer 220, and entered metal sheet 214 at the bottom of the assembled workpieces. The shoulder 230 of rotating friction stir weld tool 210 is bearing on the upper side of metal sheet 216 and heating the sheet by frictional contact. The rotation of tool 210 displaces polymer material in layer 220 from the weld site and stirs and plasticizes adjacent metal in sheets 216, 218, and 214. When the rotating friction stir weld tool 210 with probe 228 is retracted a small hole remains (similar to hole 32 illustrated in FIG. 2C) enclosed by an annular weld containing metal contributed by the friction heated and plasticized regions of the three metal sheets 216, 218, and 214. Alternatively, the rotating friction stir welding tool 210 can enter from the bottom surface of metal sheet 214 to make a weld between metal sheet 214 and metal laminate 212.

When a friction stir welding tool forms a spot weld in accordance with this invention, a hole remains where the probe of the tool penetrated the metal sheets and polymer layer(s). But weld metal surrounding the hole joins the metal workpieces from the top to the bottom metal member of the assembled layers. When the tool forms a linear weld, plasticized metal typically flows in behind the moving tool along the weld path. Any residual hole will be at the end of the path where the tool is retracted from the metal laminate and other layers.

Thus, in general, this invention can be utilized to form welds between the outer metal sheets or layers of a metal-polymer-metal laminate. And the method can be used to weld several metal sheets or layers with one or more interposed polymer layers where the formed weld extends from a top metal layer to a bottom metal layer enclosing the assembly of included polymer layer(s).

Thus, while the invention has been described in terms of some preferred embodiments, other forms can readily be adapted by those skilled in the art. The scope of the invention is defined by the following claims.

The invention claimed is:

1. A method of making a welded metallurgical bond in an automotive assembly comprising a first metal sheet-polymer layer-second metal sheet laminate and a metal workpiece to be bonded to the second metal sheet of the laminate, the method comprising:
   providing the automotive assembly comprising the first metal sheet-polymer layer-second metal sheet laminate and the metal workpiece;
   pressing a rotating tool against the automotive assembly at a predetermined location on the first metal sheet of the laminate to heat the contacted metal to a plasticized condition, the tool being sized and shaped to form a weld between the laminate and the metal workpiece at the location;
   continuing to press the rotating tool against the automotive assembly to successively plasticize, stir and penetrate engaged metal of the first and second metal sheets of the laminate and engaged metal of the metal workpiece through at least a portion of the thickness of the metal workpiece, and to displace the polymer layer; and
   retracting the tool, the plasticized metal of the two sheets and of the metal workpiece coalescing to form a weld between the two metal sheets and the metal workpiece, wherein the weld consists essentially of the plasticized metal of the two sheets and of the metal workpiece.

2. A method of making a welded metallurgical bond in an automotive assembly as recited in claim 1 in which a plurality of like welds are formed at predetermined locations in the automotive assembly.

3. A method of making a welded metallurgical bond in an automotive assembly as recited in claim 2 in which the tool is successively moved from location to location to form the welds.

4. A method of making a welded metallurgical bond in an automotive assembly as recited in claim 1 in which the weld formed by the tool between the two metal sheets and the metal workpiece is a friction stir spot weld.

5. A method of making a welded metallurgical bond in an automotive assembly as recited in claim 1 in which the rotating tool, having penetrated into the first and second metal sheets and at least a portion of the thickness of the metal workpiece, is moved in a linear path before it is retracted from the automotive assembly to form a linear weld between the two metal sheets and the metal workpiece commencing at the location of first penetration of the first metal sheet.

6. A method of making a welded metallurgical bond in an automotive assembly as recited in claim 1 in which the polymer layer is an un-cured adhesive layer and the automotive assembly is heated to cure the adhesive layer after one or more welds have been formed by the rotating tool.

7. A method of making a welded metallurgical bond in an automotive assembly as recited in claim 6 in which the adhesive layer is used to supplement a friction stir welded metal to metal joint.

8. A method of making a welded metallurgical bond in an automotive assembly as recited in claim 1 in which the polymer layer is a viscoelastic layer for vibration damping of the automotive assembly.

9. A method of making a welded metallurgical bond in an automotive assembly as recited in claim 1 in which the polymer layer is a viscoelastic layer for vibration damping of the automotive assembly and one or more welds formed by action of the tool constitute the sole metallurgical means joining the two metal sheets and the metal workpiece.

10. A method of making a welded metallurgical bond in an automotive assembly as recited in claim 1 in which the metal workpiece is a third metal sheet-polymer layer-fourth metal sheet laminate and the formed weld connects both sheet metal layers of both laminates.

11. A method of making a welded metallurgical bond in an automotive assembly as recited in claim 1 in which the metal workpiece is a metal sheet and the formed weld connects the first and second metal sheets of the laminate to the metal sheet workpiece.

12. A method of making a welded metallurgical bond in an automotive assembly as recited in claim 10 further comprising continuing to press the rotating tool against the automotive assembly to successively plasticize, stir and penetrate engaged metal of the first and second metal sheets of the laminate and engaged metal of the metal sheet workpiece through at least a portion of the thickness of the metal sheet workpiece, and to displace the polymer layer.

13. A method of making a welded metallurgical bond in an automotive assembly as recited in claim 11 further comprising continuing to press the rotating tool against the automotive assembly to successively plasticize, stir and penetrate engaged metal of the first and second, and third metal sheets and engaged metal of the fourth metal sheet through at least a portion of the thickness of the fourth metal sheet, and to displace the polymer layer.

14. A method of making a welded metallurgical bond in an automotive assembly as recited in claim 1 in which the rotating tool comprises a rotating probe and in which pressing the rotating tool against the automotive assembly comprises extending the rotating probe through at least a portion of the automotive assembly.

15. A method of making a welded metallurgical bond in an automotive assembly as recited in claim 1 in which the first metal sheet-polymer layer-second metal sheet laminate is an automotive panel or part.

16. A method of making a welded metallurgical bond in an automotive assembly as recited in claim 10 in which the third metal sheet-polymer layer-fourth metal sheet laminate is an automotive panel or part.

17. A method of making a welded metallurgical bond in an automotive assembly comprising a first metal sheet-polymer layer-second metal sheet laminate and a metal workpiece to be bonded to the second metal sheet of the laminate, the method comprising:
   providing the automotive assembly comprising the first metal sheet-polymer layer-second metal sheet laminate and the metal workpiece;
   pressing a rotating tool against the automotive assembly at a predetermined location on the metal workpiece to heat the contacted metal to a plasticized condition, the tool being sized and shaped to form a weld between the metal workpiece and the laminate at the location;
   continuing to press the rotating tool against the automotive assembly to successively plasticize, stir and penetrate engaged metal of the metal workpiece, engaged metal of the second metal sheet of the laminate, and engaged metal of the first metal sheet of the laminate through at least a portion of the thickness of the first metal sheet, and to displace the polymer layer; and
   retracting the tool, the plasticized metal of the two sheets and of the metal workpiece coalescing to form a weld between the two metal sheets and the metal workpiece, wherein the weld consists essentially of the plasticized metal of the two sheets and of the metal workpiece.

* * * * *